United States Patent [19]
Nykänen

[11] Patent Number: 5,706,110
[45] Date of Patent: Jan. 6, 1998

[54] METHOD AND EQUIPMENT FOR SAVING POWER IN INFRARED DATA TRANSMISSION

[75] Inventor: Petri Nykänen, Tampere, Finland

[73] Assignee: Nokia Mobile Phones, Ltd., Salo, Finland

[21] Appl. No.: 585,014

[22] Filed: Jan. 11, 1996

[30] Foreign Application Priority Data

Jan. 13, 1995 [FI] Finland .................. 950170

[51] Int. Cl.⁶ .................. H04B 10/00; H04B 10/08
[52] U.S. Cl. .................. 359/110; 359/172; 455/343; 370/318; 370/469
[58] Field of Search .................. 359/149, 171, 359/172, 118, 110; 379/93, 98, 413; 455/343; 370/310, 318, 469; 375/222

[56] References Cited

U.S. PATENT DOCUMENTS

| | | | |
|---|---|---|---|
| 4,701,946 | 10/1987 | Oliva et al. | 379/98 |
| 5,241,284 | 8/1993 | Nyqvist et al. | 330/297 |
| 5,291,542 | 3/1994 | Kivari et al. | 379/58 |
| 5,378,935 | 1/1995 | Korhonen et al. | 327/114 |
| 5,471,655 | 11/1995 | Kivari | 455/127 |
| 5,491,721 | 2/1996 | Cornelius et al. | 379/93 |
| 5,570,359 | 10/1996 | Nguyen | 370/469 |
| 5,588,054 | 12/1996 | Shin et al. | 379/413 |

FOREIGN PATENT DOCUMENTS

| | | |
|---|---|---|
| 0 573 204 A2 | 12/1993 | European Pat. Off. |
| 0573204 | 12/1993 | European Pat. Off. |
| WO 94/29974 | 12/1994 | WIPO |

OTHER PUBLICATIONS

Patent Abstracts of Japan, vol. 18, No. 240, Abstract of JP A 6-29927 Hitachi Ltd., Feb. 4, 1994.
Patent Abstracts of Japan, vol. 18, No 240, E-1545, abstract of JP, A, 6-299927 (Hitachi Ltd), 4 Feb. 1994.

*Primary Examiner*—Kinfe-Michael Negash
*Attorney, Agent, or Firm*—Perman & Green, LLP

[57] ABSTRACT

A method is provided wherein idle periods occurring in the data transmission between various services are detected by means of a Power Manager, whereby the infrared link (IrDA-SIR) is shut down automatically. The link restarts automatically when new activity is detected. Thanks to the method, at least one of the stations can also go into the sleep mode, even though a virtual link to the application layer (7) of the other station is maintained in the application layer (7).

13 Claims, 2 Drawing Sheets

METHOD AND EQUIPMENT FOR SAVING POWER IN INFRARED DATA TRANSMISSION

BACKGROUND OF THE INVENTION

1. Field of the Invention

The invention relates to a method for saving power when using an infrared transmission medium in a data transmission system. The invention also relates to a power management block that is used to implement the method.

2. Description of the Related Art

FIG. 1 presents a diagram of the link between two stations in connection with the OSI (Open Systems Interconnection) model. The figure depicts one link between the stations, which is multiplexed in such a way that it can handle links between more than one application. This means that although there is only one reliable physical link between the stations, it can simultaneously serve several parallel transmission services of the applications. The Transmission Medium transmits the data physically. The transmission medium can be implemented with a physical data transmission medium that is known per se. The medium can be a cable from Station A to Station B that is possibly routed via several nodes, or an infrared link, radio path, etc. and it can apply a transfer method that is known per se in such a way that the data of several applications are transmitted, say, using multiplexing, as has already been mentioned. In the OSI model different levels or layers are defined. The lowest layer (1, Physical Interface) determines the characteristics of the transmission medium between two stations or nodes. The second layer (2, Data Link; Link-level Logical Interface) provides the functions, procedures, and protocol needed to establish, maintain, and release datalink connections between the data stations of a network. The datalink layer also implements functions required for reliable data transmission, such as the sending and receiving of checksums and, if needed, the presentation of retransmission requests. The third layer (3, Network; Multi-channel Logical Interface) implements the efficient application of the link layer (2), for example, in such a way that it divides the data link into several channels in which the data of several applications can be transmitted in parallel. The next layers are: 4, Transport; 5, Session; and 6, Presentation. The application layer (7 Application; Application Oriented Services) defines the characteristics which the User of the station sees in the system. The applications of the system have an interface to the presentation layer, through which they exchange data in application specific format. The presentation layer is responsible for mapping these formats to each other. The user thus need not observe the operation of the lower levels 1–6. The logical links between the layers are implemented by means of Service Access Points which define the interface between the different layers. The station can be a logical process (OS, Open System), for example, software operating on a computer, and the application can be a designated subprocess, a program. In the following the discussion concerns mainly the layers: physical equipment layer (1), data link (2), network layer (3) and application layer (7).

In data transmission between stations, use can be made of infrared data transmission systems in which at least two modes are used. One of the modes, or the basic mode, is a default value and in it the station at the end of the link does not have active data links. The other mode, or the transmission mode, is a connection mode in which a data link is formed at least between two stations. Data transfer takes place in the half duplex mode such that permission to send-signals are repeatedly sent between the stations at a high frequency. Accordingly, on the one hand a full duplex data link can be emulated and, on the other, the data transmission channel can be kept in operation so that the other stations can detect that a link between two stations is in use.

The continuous "heartbeat function" of the link connection consumes power. In the basic mode, too, in which payload data is not transferred on the link, tokens according to the transmission protocol are nevertheless transmitted via the transmission medium. The hardware used to handle access to the infrared medium must be powered up. Nor can the hardware on which the protocol software is executed be powered down.

Since the software that is used to handle the protocol is usually executed on the same CPU as the software used to implement other functions of the device in question, the sleep mode, ie, the low-power mode, of the processor or the other hardware can cause problems.

The above-presented problems have not been clearly realized for very long. At least there are no published papers on this subject. This may be due to the fact that an infrared link has only recently begun to be used on a wide scale for data transmission. Use is quite often based on the procedure presented by Hewlett Packard, which is now also being offered to other companies. For example, IrDA (Infrared Data Association) which is mentioned hereinafter, makes use of said company's serial infrared procedure (IrDA-SIR, IrDA Serial InfraRed).

All the standards have not yet been approved for data transmission based on the use of an infrared link, although the matter is being discussed within IrDA (Infrared Data Association, USA). Industrial standards have already been frozen as regards the above-mentioned (1), (2) and (3) layers, but services have not yet been specified. IrDA has produced specifications for the first four layers and is now continuing specification of the following layers, in particular, in the application and service layer. The IrDA specifications that have been presented so far appear to presuppose that the IR link of the hardware level be kept active the whole time that there is an active connection between two different applications. IrDA has published, among other things, the specifications "Serial Infrared Link Access Protocol (IrLAP)", 23 Jun. 1994 and "Link Management Protocol", 12 Aug. 1994, which here are assumed to be publications known to one versed in the art. The above-mentioned transmission medium IrDA-SIR limits the data transmission rate to a maximum of 115.2 kbit/s.

The infrared link defined by IrDA is of the half duplex type. A full duplex link can be emulated by applying certain rules. Thus, for example, it is specified that data transmission in one direction can take place in cycles having a maximum length of 500 ms, at the end of which period the transmission direction of the connection must be reversed. Even if data is not being transferred on the link, the heartbeat function ensures the permanence of the link.

Because the data link level is kept active the whole time, the stations at the ends of the link cannot go over to the sleep mode or passive mode to save current even though there has not been service-to-service traffic for a long time. When a data transmission connection has been set up between two or more stations, the heartbeat on this link confers the benefit that the hardware/software controlling the transfer medium (Media Access Control) can barr other stations from using the same IR transmission medium because the busy state is clearly indicated by the heartbeat function.

SUMMARY OF THE INVENTION

The invention is now set the task of presenting such a method or device by means of which the above-mentioned problems can be solved and by means of which the transmission medium and stations or at least some of them can be powered down when payload data is not being transmitted between applications.

The task is solved by means of the method according to the invention, and device that applies the method according to the invention.

By means of the method according to the invention, idle periods occurring in the operations of a service-to-service link can be detected and the transmission medium can automatically be powered down and powered up again when operation has been redetected. Thanks to the method according to the invention, at least one of the stations can go over to the sleep mode even though the application layer maintains a virtual connection to the other station.

The functional block according to the invention can be made an integral part of the data transmission architecture that uses infrared light. The block is capable of detecting the active and idle periods of an IR link. On the basis of this information and configurable parameters, the block can determine when the IR link is powered down and when it is powered up again. This new power management block reduces the power consumption of the stations.

Other advantageous embodiments of the invention are presented in the non-independent claims.

From the standpoint of the invention the above-presented application of the OSI model is not necessary. It is discussed mainly because it is perhaps the best known example of this kind of logical layer structure. From the standpoint of the invention it is only essential that communication between two or more stations is implemented by means of at least a two-layer system whereby the upper layer primarily handles the above-presented OSI link layer (2). The physical transmission medium could in and of itself be some other infrared link than that mentioned here. The link can also be full duplex, although it is mainly a half-duplex infrared link that is discussed here.

Devices familiar from an office environment can be considered to constitute the above-mentioned stations, to wit, a microcomputer, printer, computer keyboard, separate modem, telefax or telephone.

When this description speaks of a service, this is taken to mean a service block connected with the software of the application layer, which block forms an interface and connection to any application. The service can also form a transmission service between two applications. It is essential that the service defines the protocol by means of which the data transmission between the applications is handled.

In addition to the above-mentioned IrDA transmission method, the method according to the invention can be applied to other corresponding methods. Such are, for example, FIR (Fast InfraRed), in which the data transmission can take place at a rate of about 1.1 Mbit/s or about 4 Mbit/s. Another infrared transmission medium is so-called DASK (Digital Amplitude Shift Keying), whose transmission rate is of the same class as the IrDA-SIR system that has been mentioned. It should also be noted that the same station can make use of several means of transmission. Accordingly, for example, both IrDA-SIR, FIR and DASK can be in use with the same station.

In the following the invention is described in greater detail by means of examples and with reference to the accompanying drawings, in which FIG. 2 shows a station which supports the IrDA data communications architecture and in which the power saving method according to the invention is used. The object of the invention is to control a connection between stations in such a way that when there is an idle period in the services of the application layer, the link on the transmission medium is powered down. After powering down, the stations or at least the parts of the station connected with the physical transmission medium can go over to a low-power sleep mode which is available to them. The stations are woken up by means of an indication of activity of the physical layer or by an excitation coming from a service that has established a connection of the application layer.

BRIEF DESCRIPTION OF THE DRAWING

The invention is discussed in the following with reference to the accompanying drawing in which.

DESCRIPTION OF THE PREFERRED EMBODIMENT

Figure 1:
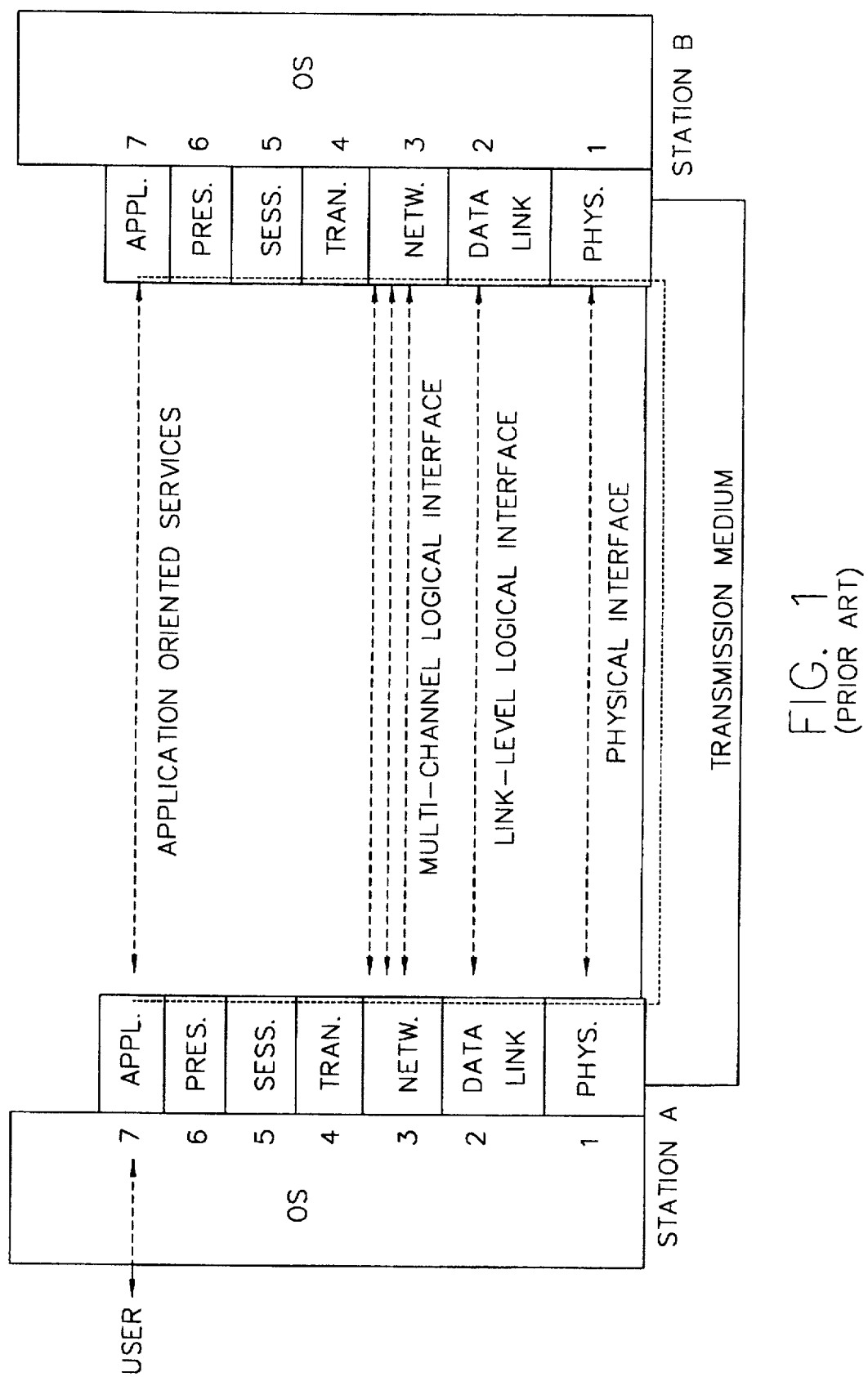
FIG. 1 shows a diagram of a link between two stations according to the OSI model and FIG. 2 shows one station of the IR link.
Figure 2:
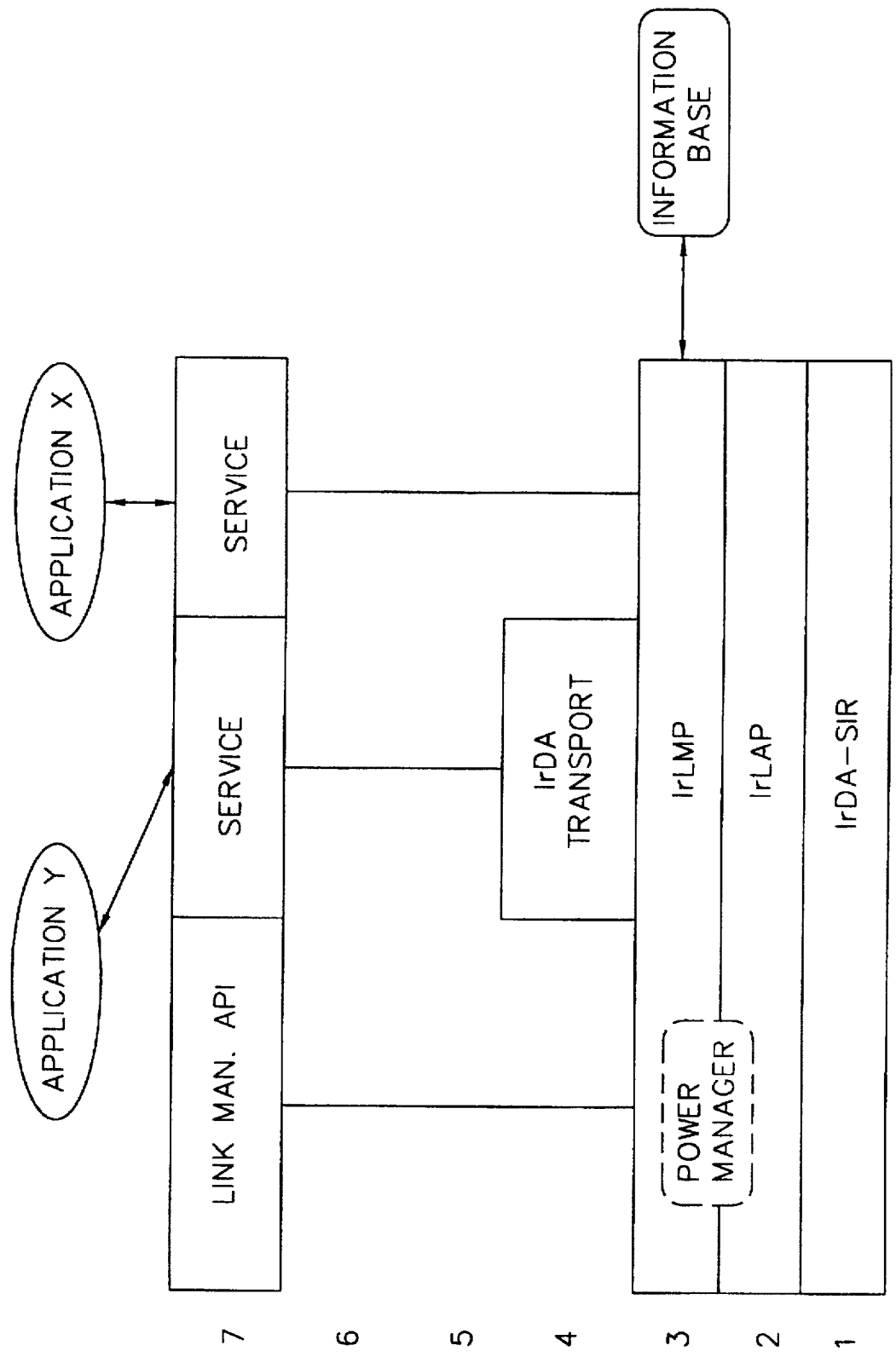

FIG. 2 shows a situation related to an infrared link, in which one of the stations of the IR link is shown in detail. IrDA has presented the specifications for the four lowest OSI layers (layers 1–4 in FIG. 1), and at present the service layer is being studied. The functional block, which is marked Power Manager (PM) in FIG. 2, represents the proposed block according to the invention, by means of which the underlying link is controlled in such a way that the user of the service does not notice any changes in the link other than a small additional delay during start-up of the link.

The layers shown in FIG. 2 correspond logically to the OSI definitions shown in FIG. 1, but now different designations are used for them. Lowermost is the physical interface, or IrDA-SIR level (IrDA Serial IR). The link layer is IrLAP, or implemented with a Serial Infrared Link Access Protocol, the specification of which was already mentioned in the general discussion. The third layer is the IrLMP (IR Link Management Protocol). Above it is the transmission layer IrDA Transport. IrDA has not yet specified layers 5 and 6. The link management block Link Manager, API, has been defined for application layer 7. In FIG. 2 the blocks "service" indicate those service blocks to which the given applications Application X, Application Y are connected. The services function as an interface block for the data exchange between the application and the link.

In order for the PM block to function transparently, it is advantageous to implement it as part of the IrLMP layer. A good solution can be considered to be implementing the PM block in the same way as the Information Access Service (IAS) of the IrLMP.

In FIG. 2 the connections of the power management block PM have not been drawn in detail because in practice this block functions preferably at the logical level. It should nevertheless have interfaces to the other processes, which are presented below.

Inputs:

IrLMP internal data structures related to IrLAP and LSAP (Link Service Access Point) connections;

Inputs from the Power Manager excitation processes;

Indications of activity of the physical layer;

Session information from a PM block at the other station.

Outputs:

IrLAP connection control;

Session information to the PM block at the other station.

In the following, operation of the power management block, PM, is examined. When connection establishment is requested from the IrDA communication architecture, the PM block tries to establish an information exchange with the corresponding block at the other station. During this procedure, the following happens:

session ID exchange;

common service idle threshold (time) negotiation;

any idle threshold values (times) that concern a specific service.

The session ID and any authentication key that may be used serve to detect the IrLAP link in question. The session ID should always be a random number so that the probability of two stations having the same ID is very small. The user of the service or the process which accesses the PM block can itself set the authentication key.

Threshold times of the idle states are used to decide when there is an idle period in the service. When all the services that have application-to-application connections are marked idle either in the IrLMP layer or in the PM block, the physical link can be shut down. This is done through an information exchange between the PM blocks. The information exchange can be done through the normal request/ acknowledgement method. The responding PM block can either accept or deny the request depending on any available active PM heartbeat service or configuration parameters.

If the PM block acting as the host device of the link accepts the shutdown request, the local PM block will request the IrLAP link to be shut down. At this point the IrLAP link is shut down in such a way that no services are informed of it. The IrLMP layer will maintain all its internal variables and states. Only the PM block will remain functional.

In this situation the power management block PM is the only functional block. It will wake the IrLMP and IrLAP layers if through its inputs it detects activity on the infrared link or if a service connected with the application level requests disconnection of an application-layer connection or if the PM block receives a request to transmit data from the application layer. After wake-up, a physical connection will be established and the PM block will check again for the session ID and any authentication key. When these are in order, the PM block will give control of the link to the IrLMP layer. If the ID and key are not in order, the IrLMP layer will be informed of the shutting down of the link and thereafter of the link connect request.

The method used for a reconnection request for the physical link depends on the nature and characteristics of the stations. Some stations are not capable of initiating the connection establishment. These stations, which are called secondaries, must use some other method of re-establishing the link connection. The IrLAP specification introduces a procedure called "sniffing". The secondary stations can use this procedure to indicate to any stations capable of initiating a connection that they wish to establish a connection to such a station. A station capable of establishing a connection is termed a primary station.

In sniffing, the knowledge of which service required the establishment of the link connection must be stored in the secondary station. This information can be stored in a database, for example, in the information base shown in FIG. 2. The primary station that originally initiated the link connection can access this database and on the basis of the information in it can find out which service connection the secondary station requires.

The method described here can also be used when a station with secondary capabilities requires establishment of an initial connection. An example of such a secondary station can be a station with DCE (Data Circuit-terminating Equipment) functionality. When an incoming call is received by the DCE, it will store the information on the service requesting the link connection in its Information Base, FIG. 2, after which it requests establishment of a connection by sniffing.

If any of the services become active while the physical transmission link of the stations has been shut down, the station will wait for a predefined threshold time. If a connection cannot be established even after this, the IrLMP layer will be informed that the link layer connection has been lost.

If the physical link between two or more stations has been shut down, some other station can "capture" this transmission medium. A situation of this type can, if needed, be prevented by transmitting information on the existence of a virtual link, in the form of a general data message, to the network or transport layer of all the other stations on the network.

The power management block PM can operate in the manner of other corresponding normal services, as has been discussed above. Accordingly, the PM block has its own LSAP (Link Service Access Point). The block is shown here as part of the IrLMP layer and it can easily be adapted to functions according to the present specifications with very minor changes. This procedure is at present considered to be the most advantageous because in this case the PM block can access all the data structures available in the IrLMP layer. This ensures that the PM block definitely controls the link layer and services.

On the other hand, the PM block can be implemented alternatively as part of the IrLMP layer so that it does not have any service interface LSAP. This would nevertheless require modification of the present IrLMP specification.

A third alternative of using a PM block is seen to be the possibility that the PM block is implemented as the subblock of a service. In this case it would have a very limited access to the IrLMP layer in high-end devices, which use dynamic loading of services. On the other hand, this approach would work quite well in a system having only a limited number of fixed services.

One versed in the art will understand that although the invention is presented here as a software functional block, the principle underlying the invention can also be implemented through a hardware block which is connected appropriately to the logical level above the transmission medium.

The spirit of the invention can also be applied in different ways than have been discussed above. Accordingly, it can be contemplated that one of the stations is a central main station and the other stations merely receiving remote stations. The central station transmits synchronization data to the remote stations relatively seldom, for example, the synchronization signal of a precise clock. In this case, the power management block according to the invention is applied to each station.

I claim:

1. A method for saving power in a data transmission system using an infrared transmission medium between two or more stations, employing at least a two-layer data transmission structure whereby a lower layer controls the transmission medium and a next higher layer controls logical data communications, comprising the steps of:

step 1, providing a Power Manager means for the next higher layer;

step 2, routing activity data relating to the next higher layer's requirement to transmit payload data to the Power Manager;

step 3, shutting down the transmission medium by the Power Manager means when the activity data indicates that the next higher layer is not required to transmit payload data;

step 4, starting up the transmission medium when the activity data indicates that the next higher layer requires transmission of payload data; and step 5, initiating a low-power sleep mode on at least one of the stations in which the Power Manager is an actively functioning device block.

2. A method according to claim 1 wherein the data transmission system includes an OSI system (Open System Interface).

3. A method according to claim 1 wherein the activity data comprises configuration data.

4. A method according to claim 3, wherein the configuration data is the threshold value of the idle states, whereby the shutting down takes place when an idle period longer than the threshold value occurs in the transmission of payload data.

5. A method according to claim 3, whereby a first one of the stations is a primary station and another one of the stations is a secondary station which is not itself capable of initiating establishment of a data transmission connection, further including the step wherein the secondary station transmits an indication of the activity of the transmission medium to the primary station means of an IrDA "sniffing" procedure, whereby the basic data required by the data transmission link at any given time is stored in a database of the secondary station.

6. A power manager according to claim 5, wherein the Power Manager means is connected to the next higher layer of the station's data communications structure, to which next higher layer an Information Base can also be connected for the IrDA "sniffing" procedure.

7. A method according to claim 6, including the step of controlling the basic and communications modes of the infrared transmission medium by the Power Manager means in conformity with the IrDA transmission procedure, wherein the inputs of the Power Manager means are: inputs from the next higher layer's internal data structures, which are connected to IrLAP and LSAP links; inputs from the Power Manager's excitation processes; indications of the activity of the physical layer; and session information on the Power Manager at the other station; and wherein the outputs of the Power Manager are: IrLAP connection control; session information to the Power Manager at the other station.

8. A method according to claim 1 wherein the infrared transmission medium conforms to the Infrared Data Association (IrDA) transmission procedure.

9. A method according to claim 1 wherein the activity data comprises an indication of the activity of the transmission medium.

10. A method according to claim 1 wherein the activity data comprises an excitation of the service of the upper layer.

11. A method according to claim 1 wherein the infrared transmission medium conforms to a fast infrared (FIR) transmission procedure.

12. A method according to claim 1 wherein the infrared transmission medium conforms to a Digital Amplitude Shift Keying (DASK) transmission procedure.

13. A method of saving power in a data transmission system using an infrared transmission medium between two or more stations, which has at least two modes whereby in a first mode the transmission medium is in a basic mode when payload data is not transmitted between the stations and whereby in a second mode the transmission medium is in a communication mode when payload data is transmitted between the stations, comprising the steps of:

step 1, providing a Power Manager means;

step 2, routing activity data on the transmission medium to the Power Manager means;

step 3 shutting down the transmission medium by the Power Manager means when the transmission medium is in the basic mode;

step 4, starting up the transmission medium when the transmission medium goes into the communication mode, wherein at least one of the stations goes into a low-power sleep mode in which the Power Manager means is an actively functioning device block.

* * * * *